United States Patent
Auriac et al.

(10) Patent No.: US 8,915,469 B2
(45) Date of Patent: Dec. 23, 2014

(54) SYSTEM FOR DRAINING WATER CONDENSATION IN AN AIRCRAFT

(75) Inventors: Vincent Auriac, Saint Orens de Gameville (FR); Jérôme Modesto, Larra (FR)

(73) Assignee: Airbus Operations S.A.S., Toulouse (FR)

(*) Notice: Subject to any disclaimer, the term of this patent is extended or adjusted under 35 U.S.C. 154(b) by 32 days.

(21) Appl. No.: 13/543,379

(22) Filed: Jul. 6, 2012

(65) Prior Publication Data

US 2013/0009010 A1    Jan. 10, 2013

(30) Foreign Application Priority Data

Jul. 6, 2011 (FR) ...................................... 11 56127

(51) Int. Cl.
*B64C 1/00* (2006.01)
*B64D 13/00* (2006.01)
*B64C 1/40* (2006.01)
*B64C 1/14* (2006.01)

(52) U.S. Cl.
CPC ............... *B64C 1/403* (2013.01); *B64C 1/1453* (2013.01)
USPC ........................................ 244/119; 244/118.5

(58) Field of Classification Search
USPC .............................................. 244/118.5, 119
See application file for complete search history.

(56) References Cited

U.S. PATENT DOCUMENTS

| | | | | | |
|---|---|---|---|---|---|
| 3,321,159 | A | * | 5/1967 | Jackson | 244/135 R |
| 3,740,905 | A | * | 6/1973 | Adams | 52/404.3 |
| 3,867,244 | A | * | 2/1975 | Adams | 428/182 |
| 4,291,851 | A | * | 9/1981 | Johnson | 244/119 |
| 4,715,561 | A | * | 12/1987 | Spinosa et al. | 244/129.1 |
| 5,398,889 | A | * | 3/1995 | White et al. | 244/119 |
| 5,577,688 | A | * | 11/1996 | Sloan | 244/117 R |
| 5,779,193 | A | * | 7/1998 | Sloan | 244/117 R |
| 5,827,598 | A | * | 10/1998 | Larsen et al. | 428/131 |
| 6,467,727 | B1 | * | 10/2002 | De Felipe | 244/118.5 |
| 6,491,254 | B1 | * | 12/2002 | Walkinshaw et al. | 244/118.5 |

(Continued)

FOREIGN PATENT DOCUMENTS

WO    WO 2007/107281 A1    9/2007

OTHER PUBLICATIONS

French Preliminary Search Report issued on Jan. 30, 2012 in corresponding French Application No. 1156127 filed on Jul. 6, 2011 (with an English Translation of Categories).

*Primary Examiner* — Timothy D Collins
*Assistant Examiner* — Steven Hawk
(74) *Attorney, Agent, or Firm* — Oblon, Spivak, McClelland, Maier & Neustadt, L.L.P.

(57) ABSTRACT

The invention relates to an aircraft comprising:
a drainage system for condensation water formed in the aircraft between an upper zone thereof where the condensation water is formed and a lower zone where it is collected,
a thermal insulation blanket (16) having two opposite faces, a first face (16a) of which is arranged facing the fuselage. The drainage system includes a drainage duct (18, 24) which extends into the upper zone along the second opposite face (16b) of the insulation blanket and which is connected to a pass-through device (30; 40) for the blanket placed beneath the upper zone. In this way, the drained condensation water passes through the blanket through the pass-through device and then is drained to the lower zone, between the first face of the blanket and the fuselage.

15 Claims, 1 Drawing Sheet

(56) References Cited

U.S. PATENT DOCUMENTS 6,886,783 B2 * 5/2005 Guard et al. .................. 244/119
8,245,974 B2 * 8/2012 Paul ........................... 244/129.1
2004/0256520 A1 * 12/2004 Guard et al. .............. 244/117 R
2005/0211842 A1 * 9/2005 Hoffjann et al. .............. 244/119
2008/0302910 A1 * 12/2008 Calamvokis ............... 244/118.5
2010/0044512 A1 * 2/2010 Paul ........................... 244/129.1

* cited by examiner

A-A

SYSTEM FOR DRAINING WATER CONDENSATION IN AN AIRCRAFT

The invention relates to a drainage system for condensation water in an aircraft.

In an aircraft such as a commercial airplane, the air in the passenger cabin is relatively moist.

By breathing, the passengers contribute significantly to this moisture.

Furthermore, when the aircraft is at high altitude, in particular at a cruising altitude, the temperature of the outside air is very low and the structure of the aircraft therefore is very cold.

When the aircraft descends, the water contained in the air of the passenger cabin condenses on the cold walls of the fuselage.

A drainage system then is provided in order to convey the water that has condensed on the walls of the passenger cabin from this cabin to a low point of the fuselage.

In this way, the water first is accumulated in gutters disposed in the passenger cabin at the top, then is conveyed via drainage ducts to the lower zone.

The drainage ducts are spaced apart from each other longitudinally along the aircraft.

A thermal insulation blanket is disposed facing the fuselage in order to protect the passengers from the cold and extends from the passenger cabin to a low zone of the fuselage.

The drainage ducts extend downward along the insulation blanket, pass through the floor of the passenger cabin and continue to run alongside the blanket to the low zone.

Each drainage duct is fastened to the wall of the fuselage by fastening systems disposed at an interval from one another and which pass through the insulation blanket.

Although this drainage system is satisfactory, it would be advantageous to be able to have a less heavy system, comprising fewer parts and requiring a shorter installation time.

This invention seeks to remedy at least one of the aforementioned drawbacks.

In this regard, the invention applies to an aircraft comprising:
- a drainage system for condensation water formed inside the fuselage,
- a thermal insulation blanket having two opposite faces, a first face of which is arranged facing a wall of the fuselage, the drainage system including at least one drainage duct which extends partially along the second opposite face of the insulation blanket, characterized in that the drainage system comprises at least one pass-through device for the insulation blanket connected to the said drainage duct so that the drained condensation water passes through the insulation blanket through the said at least one pass-through device, the said condensation water then being drained between the first face of the insulation blanket and the wall of the fuselage.

The drainage system according to the invention makes it possible to eliminate a part of the systems for fastening drainage ducts to the fuselage which, in the prior art, are present for example all the way to the low point of the aircraft where the condensation water is collected.

In this way the drainage system according to the invention includes fewer parts than previously and therefore is simplified.

Furthermore, by virtue of the invention, because of the pass-through device for the insulation blanket, the condensation water having passed through is drained between the wall of the fuselage and the first face of the blanket without any drainage duct.

The number of component parts of the system therefore is still further reduced, thereby simplifying the system even more.

The operations for installation of the system in an aircraft therefore are shortened and simplified, which considerably reduces installation time.

Furthermore, the drainage system is less heavy and less cumbersome than in the prior art.

According to a possible characteristic, the first face of the insulation blanket forms part of the drainage system and serves as a drain for the condensation water having passed through the blanket and leaving the said at least one pass-through device so as to drain it to a given zone (for example at the bottom part of the aircraft).

The condensation water leaving the device flows for example over the first face of the blanket which generally is smooth and hydrophobic to allow the water to slide along on top.

The first face of the blanket more or less follows the contour of the wall of the fuselage all the way into the lower zone.

According to a possible characteristic, the said at least one pass-through device is positioned in relation to the vertical so that the condensation water leaves same and flows more or less, for example vertically, over the first face of the insulation blanket.

The pass-through device positioned in this way makes it possible to move away from the wall of the fuselage the part of the insulation blanket situated beneath the device and in this way impart to the blanket a slant in relation to the vertical. This slant forming a V with the wall allows the blanket to receive the condensation water passing through the device. In this way drainage over the first face of the insulation blanket is favored.

According to a variant, however, drainage of the condensation water alternatively may be provided mainly via the wall of the fuselage. The slant of the device makes it possible to favor drainage via the first face of the blanket or via the wall.

According to another variant, neither the first face of the blanket nor the wall of the fuselage is favored for providing drainage. The condensation water then is drained into the channel formed between the first face and the wall. It should be noted that in this variant, one and/or the other of the first face and the wall may contribute to the drainage.

According to another possible characteristic, the said at least one pass-through device has an outlet passage section for the condensation water which forms with the vertical an angle more or less between 10° and 90°.

The outlet passage section of the device in places also forms this angle with the wall of the fuselage. In this way, the passage section in places forms an inverted V with the wall.

The minimum angle is approximately 10° so that the drainage duct that descends vertically along the second face of the blanket is not too curved to be connected to the pass-through device for the blanket. An excessively large curvature actually would be likely to damage the duct which generally is flexible.

Moreover, an excessively small angle might well hamper the flow of the condensation water, creating a stagnation zone for this water inside the pass-through device and where an icing phenomenon would be likely to occur.

According to another possible characteristic, the said at least one pass-through device is assembled on a support which is fastened to the wall of the fuselage or is assembled directly on the wall of the fuselage.

In this way, two arrangements are possible, one or the other able to be used so as to take into account in particular the configurations of the aircraft and the space constraints.

It will be noted that the drainage system according to the invention involves only one pass-through device for the insulation blanket per drainage duct.

According to another possible characteristic, the said at least one device comprises two parts, a first part for connection with the said at least one drainage duct and a second part passing through the insulation blanket, the second part being provided with at least one assembly component for assembly on the support or directly on the wall of the fuselage.

The first part of the device is adapted to the drainage duct while the second part is adapted to the insulation blanket, as well as to the assembly of the device, either on a support or directly on the wall of the fuselage.

According to a possible characteristic, the first part for connection with the drainage duct has variable dimensions adapted to those of the said drainage duct, while the second part still has the same configuration.

The first connection part of the device therefore is adapted to the dimensions of the duct and thus may take on different possible diameters. As regards the configuration of the second connection part, it remains unchanged irrespective of the dimensions of the duct.

According to another possible characteristic, the said at least one pass-through device comprises a component forming an axial stop. This component forms for example an axial stop for a drainage duct that is connected to the first connection part.

When the drainage duct is connected to the first connection part of the device, for example by force fit or assembly on this first connection part, the component forming an axial stop prevents the movement of the drainage duct beyond this component.

It furthermore will be noted that such a component also is useful for facilitating gripping of the pass-through device during manipulation thereof.

According to another possible characteristic, the component forming an axial stop is adapted to compressing the insulation blanket. In this way the blanket is compressed when the device is installed on the blanket.

According to another possible characteristic, the support fastened to the wall of the fuselage comprises a first portion fastened to the wall and a second portion on which the second part of the said at least one pass-through device is assembled through the said at least one assembly component.

It will be noted that this support may be designed so as to be adapted to different aircraft configurations as well as to space constraints.

In this regard, one of the portions of this support is configured to adapt to the local arrangement of the wall of the fuselage, while the other portion is configured for interfacing and cooperating with the pass-through device, and in particular with the assembly component or components of the latter.

According to another possible characteristic, the second portion of the support is slanted in relation to the first portion and in relation to the vertical.

Thus slant makes it possible to adapt to the positioning of the pass-through device in relation to the vertical.

As mentioned above, the positioning of the device is adjusted, for example, so that the condensation water leaving the latter flows over the first face of the insulation blanket and/or over the wall of the fuselage.

According to another possible characteristic, the second portion of the support has the same slant in relation to the vertical as the outlet passage section of the said at least one pass-through device.

In this way, the second portion of the support which is held in a fixed position in relation to the wall of the fuselage determines the positioning, in relation to the vertical and to the wall of the fuselage, of the pass-through device and, more particularly, of the outlet passage section of the latter.

According to another possible characteristic, the second portion has a through-hole in which the said at least one assembly component is inserted axially, the said at least one assembly component being provided with at least one retaining element preventing axial withdrawal thereof out of the hole.

In this way a portion of the second part of the pass-through device that is equipped with the assembly component or components is inserted into the through-hole in an axial direction, perpendicular to the section of the hole.

The assembly component or components having passed through the hole thus end up on the other side thereof and, by virtue of the presence of one or more retaining elements, axial withdrawal out of the hole (in the direction opposite to that of insertion) is made impossible.

According to another possible characteristic, the said at least one assembly component has a free end that projects out of the hole and that includes the said at least one axial retaining element.

According to another possible characteristic, the free end has radial dimensions greater than the diameter of the through-hole and is elastically deformable in the radial direction in order to allow axial insertion thereof into the hole.

This allows a particularly easy assembly of the device on the support.

Conversely, the radial elastic deformation also is used to withdraw the device from the support.

According to a possible characteristic, the drainage system is able to drain the condensation water between an upper zone of the aircraft where the said water is formed and a lower zone where it is collected, the insulation blanket being arranged from the upper zone to the lower zone, the said at least one drainage duct extending into the upper zone and the said at least pass-through device being arranged in proximity to a separation between the upper zone and an intermediate zone situated between the upper and lower zones, the condensation water being drained from the intermediate zone to the lower zone.

According to a possible characteristic, the upper zone is a passenger zone and the intermediate zone is a non-passenger zone (not laid out to accommodate passengers) separated from the upper zone by a floor.

The intermediate zone is for example a cargo zone or a zone equipped with on-board electronic systems.

In general, the pass-through device for the insulation blanket is arranged for example beneath the floor separating the upper zone from the intermediate zone, or even at the floor.

According to another aspect, the invention also has as an object a method for drainage of condensation water formed inside the fuselage of an aircraft, a thermal insulation blanket having two opposite faces and a first face being arranged facing a wall of the fuselage, the method comprising a step of draining condensation water partially along the second opposite face of the thermal insulation blanket, characterized in that the method comprises the following steps:

draining the condensation water through the insulation blanket, draining the said condensation water having passed through the insulation blanket between the first face of the insulation blanket and the wall of the fuselage.

The advantages and characteristics relating to the drainage system according to the invention such as briefly mentioned above also apply to the method and therefore will not be repeated here.

According to a possible characteristic, drainage of the condensation water having passed through the insulation blanket is accomplished via the first face of the said insulation blanket and/or via the wall of the fuselage.

According to a possible characteristic, the drainage method is able to drain the condensation water between an upper zone of the aircraft where the said water is formed and a lower zone where it is collected, the insulation blanket being arranged from the upper zone to the lower zone, the said at least one drainage duct extending into the upper zone and the said at least pass-through device being arranged in proximity to a separation between the upper and an intermediate zone situated between the upper and lower zones, the condensation water being drained from the intermediate zone to the lower zone.

According to another possible characteristic, the upper zone is a passenger zone and the intermediate zone is a non-passenger zone separated from the upper zone by a floor.

Other characteristics and advantages will become apparent in the course of the description that is going to follow, provided only by way of non-limitative example and presented with reference to the attached drawings, on which:

Figure 1:
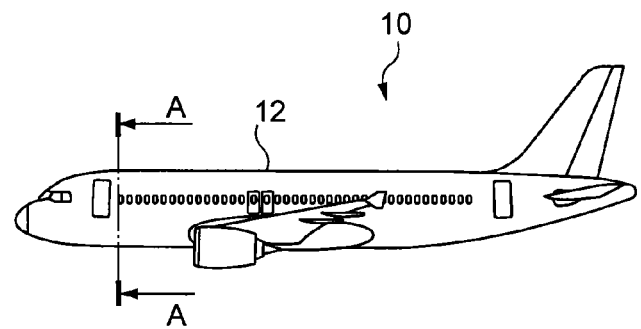
FIG. 1 is a general view of an aircraft according to the invention.

As shown on FIG. 1 and designated by the general reference 10, an aircraft, for example a commercial airliner, integrates a drainage system for condensation water according to the invention.

Figure 2:
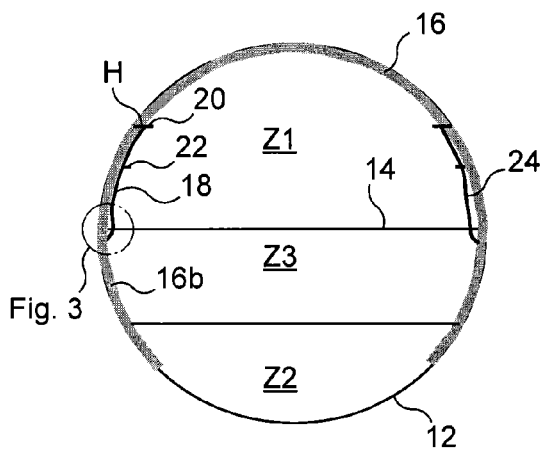
FIG. 2 is a cross section AA of the fuselage of the aircraft of FIG. 1.

More particularly, the aircraft comprises a fuselage 12, a view of which in cross section AA is shown on FIG. 2.

On this view, the inside of the fuselage is divided into several zones or compartments depending on the height of the fuselage.

In this way, a first zone Z1 which here is, for example, a passenger zone, also called passenger cabin, is delimited by the semicircular upper part of the fuselage in the plan of FIG. 2 and by a horizontal separation wall or floor 14.

Beneath this floor 14, two zones are arranged, a first zone situated at the bottom part of the fuselage, marked Z2, and a second intermediate zone, marked Z3, situated between upper zone Z1 and lower zone Z2.

Intermediate zone Z3 may be a cargo-type zone, that is to say that it is intended to hold containers or electronic systems and equipment as is the case toward the front of the aircraft, near the cockpit.

The condensation water that forms in zone Z1 (passenger cabin) is collected or received at the low point of the fuselage in lower zone Z2, after having been drained from zone Z1 to zone Z2.

It will be noted that in other aircraft configurations, the definition and the number of the zones or compartments are likely to vary. It thus is possible to have only one or two zones allocated or not allocated to passengers.

A thermal insulation blanket 16 is disposed facing the wall of the fuselage 16 over almost all of this wall with the exception of lower zone Z2 as shown on FIG. 1.

The insulation blanket, which may consist of several parts or several blankets connected or superposed on each other according to the configurations of the aircraft, is fastened to the wall of the fuselage in known manner not shown on the drawings.

Figure 3:
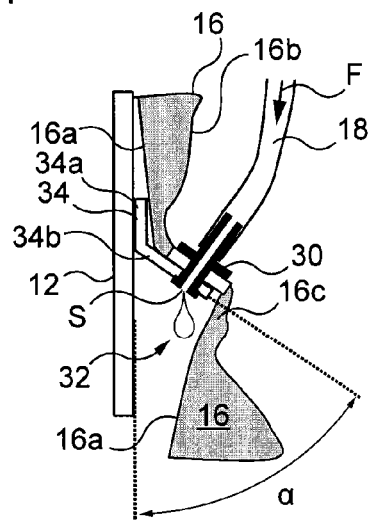
FIG. 3 is an enlarged partial schematic view from FIG. 2 of a region of the aircraft where the drainage system according to the invention is installed.

Insulation blanket 16 shown on enlarged FIG. 3 has two opposite faces, a first face 16*a* which is arranged facing wall 12 of the fuselage and a second opposite face 16*b* which faces the inside of the aircraft (passenger cabin).

The drainage system for the condensation water according to the invention comprises, for example, several drainage ducts spaced longitudinally along the length of the aircraft on each of the opposite sides of the wall of the fuselage, as shown on FIG. 2 with two ducts 18 and 24.

It will be noted that in aircraft configuration variants, the number and arrangement of the drainage ducts may vary.

Thus, as shown on FIG. 2, a first drainage duct 18 extends from a high point H situated at the top of upper zone Z1 going toward floor 14 following more or less the contour of insulation blanket 16 and, more particularly, of second opposite face 16*b*.

It will be noted that at point H the condensation water is accumulated by gutters to which the drainage ducts such as duct 18 of FIG. 2 are connected directly or indirectly.

Fastening systems 20, 22 ensure in upper zone Z1 the fastening of duct 18 to the wall of the fuselage 12 through insulation blanket 16.

The number of fastening systems shown on FIG. 2 is only an example and of course it may vary according to the aircraft and the configuration thereof.

Likewise, another drainage duct 24 is disposed near the opposite wall of the fuselage (FIG. 2), facing the second opposite face of the insulation blanket.

The arrangement and the characteristics of this second drainage duct are identical to what has been described previously for first duct 18.

As shown on FIG. 2, drainage ducts 18 and 24 extend to the outside of the insulation blanket all the way to floor 14 and pass through this floor to enter intermediate zone Z3.

Beneath the wall of floor 14, a device 30 is installed on the blanket in proximity to this wall.

More particularly, this device is installed on the blanket as close as possible to wall 14 taking space constraints into account.

It will be noted that in a variant not shown, the device may be integrated into floor or bridge 14, for example from the top. The floor configured in this way serves as a "pass-through."

This device passes through the blanket and is hollow so as to allow the condensation water to flow inside same and in this way to pass through the blanket.

To accomplish this, drainage duct 18 having passed through wall 14 is linked/connected to pass-through device 30 as shown very schematically on FIG. 3.

The condensation water conveyed by duct 18 and which flows in the direction indicated by the arrow F enters the device and leaves the latter by the drop 32, as shown very schematically.

This condensation water then is drained into the region situated between fuselage wall 12 and insulation blanket 16, from intermediate zone Z3 to lower zone Z2 where it is received, then discharged outside the aircraft in known manner.

As shown on FIG. 3, the drainage duct which up to there adopted a generally straight position, is curved so as to be able to be assembled on device 30. This device is positioned in relation to the vertical and to the wall of the fuselage in a manner appropriate for allowing flow of the condensation water leaving same over first face 16a of the insulation blanket.

It will be noted that the slanted assembly of pass-through device 30 serving as drainage insert makes it possible to move the blanket away from the wall of the fuselage. As shown on FIG. 3, blanket portion 16c situated beneath device 30 is curved moving away from wall 12, thus allowing condensation water 32 to fall onto face 16a of the blanket, in controlled manner.

In this regard, it will be noted that this first face has, for example, a film of hydrophobic material, generally smooth, which is for example a plastic film along which the water can flow freely.

According to a variant, the condensation water flows along the wall of the fuselage which serves as a drain. The wall of the fuselage may be made for example of composite materials, and no special coating or treatment has to be provided. For a wall made of metal material, an anticorrosive surface treatment for example is applied beforehand.

It furthermore will be noted that in the same manner as that which has just been described regarding duct 18, opposite drainage duct 24 also is connected to a pass-through device for the insulation blanket, as described previously.

As for the description provided with reference to duct 18, the condensation water conveyed by duct 24 flows, after passage through the pass-through device for the corresponding blanket, along the first face of the insulation blanket which thus serves as a drain for this water, to lower zone Z2.

As shown on FIG. 3, pass-through device 30 installed on insulation blanket 12 is not assembled/fastened directly on the wall of the fuselage, but through support 34. Support 34 includes a first portion 34a fastened to wall 12 in known manner (adhesive bonding, welding, riveting . . . ) and a second portion 34b on which device 30 is assembled.

On FIG. 3, this second portion 34b is shown in slanted position and first portion 34a is shown arranged parallel to the wall and against the latter.

Other configurations, however, may be considered and, according to the environment and in particular the configuration of the wall of the fuselage and various structures which are fastened thereto, the two portions of the support are not necessarily slanted in relation to one another.

As already mentioned above, device 30 is slanted in relation to the vertical and in relation to the wall of the fuselage so as to allow the condensation water leaving the latter to flow in controlled manner, for example, along the first face of the insulation blanket.

Device 30 comprises an outlet passage section (S) for the condensation water which forms with the vertical (and here with the wall of the fuselage) an angle $\alpha$ which ranges more or less between 10 and 90°.

The minimum angle of 10° has been selected in adapted manner to allow drainage duct 18 to be connected to device 30 with an acceptable curvature radius.

If, in fact, the elbow formed by the drainage duct for its connection to device 30 is too pronounced, this duct might well be pinched, or even damaged.

An angle of 0° therefore would have to be excluded for this reason. Furthermore, the positioning of the device even may, in an extreme case, range up to an angle of 90° for which the drainage duct would be not be curved.

By way of example, an angle of 45° is an acceptable value which makes it possible not to curve the drainage duct in too constraining a manner and also not to increase the bulk of the system too significantly.

The description of pass-through device 30 or drainage insert with reference to FIG. 3 which has just been presented is of general scope and applies to any type of device.

Figure 4:
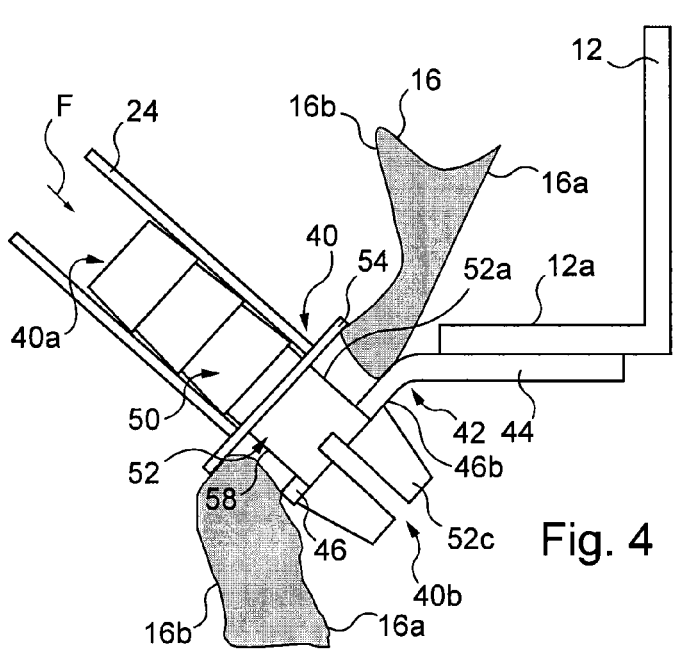
FIG. 4 is an enlarged schematic view of a part of the drainage system according to the invention.

FIG. 4 illustrates in enlarged schematic manner a part of a drainage system according to the invention.

On this Figure, drainage duct 24 of FIG. 2 has been shown, assembled on a pass-through device 40 or drain insert for thermal insulation blanket 16.

Device 40 is assembled on a support 42 which itself is fastened to the wall of the fuselage 12.

Support 42 is different from support 34 of FIG. 3 inasmuch as it is fastened over a radial dimension 12a of the wall of the fuselage 12 and not directly against the latter, as on FIG. 3.

The characteristics and advantages set forth above with reference to the embodiment of FIG. 3 apply here and will not be repeated.

Figure 5:
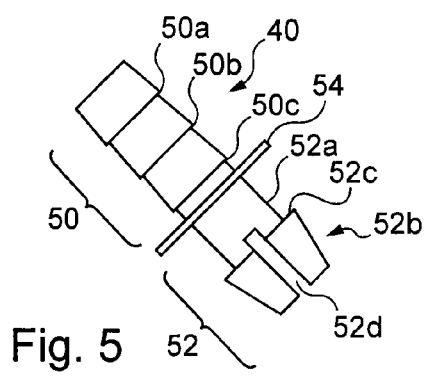
FIG. 5 is a schematic view showing in isolated manner a pass-through device for a thermal insulation blanket according to the invention.
Figure 6:
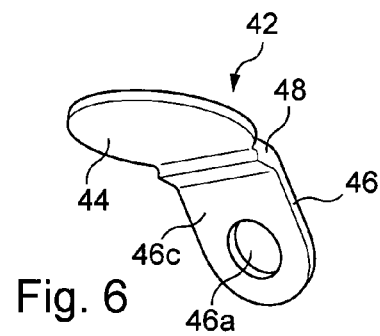
FIG. 6 is a schematic view in perspective of a support cooperating with the device of FIG. 5.

Device 40 and its support 42 are illustrated respectively on FIGS. 5 and 6.

Support 42 is fastened for example by adhesive bonding, welding or riveting to the radial (here horizontal) extension 12a of wall 12.

It should be noted that the support in this form or in a different form alternatively could be assembled on elements assembled on the wall such as structural reinforcements (for example I-shaped reinforcements, beams, beneath the floor of the passenger cabin . . . ) or be directly assembled on the vertical wall of the fuselage.

The part forming support 42 shown on FIG. 6 in perspective and turned by 180° in relation to the position of FIG. 4 has a first portion 44 intended to be fastened to the wall.

This part also comprises a second portion 46 intended to receive device 40 (FIG. 4).

Second portion 46 is slanted in relation to the first portion and also in relation to the vertical.

More particularly, portion 46 has the same slant in relation to the vertical and to the wall of the fuselage as the outlet passage section of pass-through device 40 (passage section S of device 30 shown on FIG. 3).

First portion 44 has for example a general disk shape but may take on other shapes. It will be noted that first portion 44 of the support may be self-adhering on its upper face or its lower face depending on the face which is to be fastened to the structure of the aircraft. Second portion 46 has a through-hole 46a of circular shape, for example.

The two portions 44 and 46 are connected to one another by a thick intermediate portion 48 which provides rigidity of the assembly and resistance to the various stresses to which part 42 may be subjected, in particular during the assembly of device 40 thereon and then during the installation of duct 24 on device 40.

Device 40 shown on FIGS. 4 and 5 has a general oblong shape, for example cylindrical, which is hollow so as to allow the water to pass through same from an upstream end 40a to the other opposite downstream end 40b as indicated by the arrow F.

The hollow part is shown on FIG. 3 but not on FIG. 4 although it nevertheless is present in device 40.

In this way device 40 comprises a first part referred to as part 50 for connection with drainage duct 24 and a second part 52 passing through the insulation blanket and which is provided with at least one assembly component for assembly on support 42.

Drainage duct 24 which is made of a flexible material is for example force assembled/fitted on first part 50.

This first part which is for example of general cylindrical shape, has from upstream to downstream a succession of rims or steps on its outer face which ensure imperviousness to fluid between duct 24 and first part 50.

More particularly, the outer face of first part 50 has from upstream to downstream a succession of portions each having the shape of a truncated cone and where the base of the cone is directed downstream in the direction of flow of the condensation water.

In this way the outer face of the wall of first part 50 is provided with rims forming shoulders that prevent the condensation water from passing between duct 24 and part 50 of the device.

Second part 52 is separated from the first part by a component 54 here having, for example, the shape of a circular flange and which serves as an axial stop for duct 24 during its insertion around first part 50 of device 40.

Second portion 52 generally includes a straight cylindrical portion 52a and an end portion 52b having the general shape of a cone frustum, the base of which directed upstream has dimensions greater than the diameter of upstream cylindrical portion 52a and in this way forms a rim/shoulder 52c.

An axial slot 52d is implemented in end portion 52b and extends into straight portion 52a, thus separating the cone frustum into two parts on either side of the axial slot.

This axial slot allows end portion 52b to be elastically deformed in the radial direction so that the two parts of the cone frustum come closer to one another under the action of a tightening force and move away again when the force ceases.

Installation of the drainage system according to the invention is particularly simple.

Drainage duct 24 is for example force assembled around first protruding part 50 of device 40 and the latter is installed on the insulation blanket and on support 42 placed behind this blanket.

More particularly, an insulating compressible foam rubber insert 58 is provided in places in insulation blanket 16 and second part 52 of pass-through device 40 is force inserted through the through-hole of this insert 58.

It will be noted that the thickness of foam rubber insert 58 is greater than the distance or space between flange 54 and front face 46c of the second portion so that the compressed foam rubber between these two surfaces is able to exert on the flange (stop component) a force directed upstream, so as to hold the rim or shoulder 52c against anterior face 46b.

End portion 52b of pass-through device 40 then is inserted through through-hole 46a of support 42.

The radial dimensions (or diameter) of end portion 52 or free end of second part 52 are greater than the diameter of through-hole 46a, but the presence of axial slot 52d allows passage of the entire end portion 52b through this hole.

When end portion 52b has passed through the hole, the tightening force exerted by the walls of the hole on the two cone half-portions of end portion 52b ceases and the latter then move away.

Rim or shoulder 52c thus comes into contact with anterior face 46b of second portion 46 of the support, which face is opposite front face 46c in contact with foam rubber insert 58.

This rim or shoulder 52c thus forms a retaining element preventing axial withdrawal of the device out of the hole.

It will be noted that end portion 52b of device 40 forms a component for assembly of device 40 on support 42.

It will be noted that, in variants not shown, other systems for assembly of the device on a support may be considered.

By way of example, an assembly system with external thread on the device and with a nut on the support may be considered.

Alternatively, an internal thread in through-hole 46a of the support may be provided to cooperate with an external thread on the end portion of the device.

The mechanism for assembly of the device on the support comes as a clipping or ratcheting system.

It will be noted that the mechanism for clipping of ratcheting device 40 on the support is reversible and thus makes it possible to dismantle the device with regard to the support and the blanket.

The invention claimed is:

1. Aircraft comprising:
   a fuselage;
   a drainage system for condensation water formed inside the fuselage; and
   a thermal insulation blanket having two opposite faces a first face of which is arranged facing an inner surface of a wall of the fuselage and a second opposite face arranged facing an interior space of the fuselage, wherein the drainage system comprising:
   at least one drainage duct which partially extends along the second opposite face of the insulation blanket facing the interior space,
   at least one pass-through device for the insulation blanket, said pass-through device coupled to the inner surface of the wall of the fuselage and connected to the said drainage duct so that the drained condensation water passes through the insulation blanket through the said at least one pass-through device, the said condensation water then being drained between the first face of the insulation blanket and the inner surface of the wall of the fuselage.

2. Aircraft according to claim 1, wherein the first face of the insulation blanket forms part of the drainage system and serves as a drain for the condensation water having passed through the blanket and leaving the said at least one pass-through device so as to drain it to a given zone.

3. Aircraft according to claim 2, wherein the said at least one pass-through device is positioned in relation to the vertical so that the condensation water leaves same and flows over the first face of the insulation blanket.

4. Aircraft according to claim 3, wherein said at least one pass-through device has an outlet passage section (S) for the condensation water that forms with the vertical an angle ranging more or less between 10° and 90°.

5. Aircraft according to claim 1, wherein said at least one pass-through device is assembled on a support which is fastened to the wall of the fuselage or is assembled directly on the wall of the fuselage.

6. Aircraft according to claim 5, wherein said at least one pass-through device comprises:
- a first part for connection with the said at least one drainage duct; and
- a second part passing through the insulation blanket, the second part being provided with at least one assembly component for assembly on the support or directly on the wall of the fuselage.

7. Aircraft according to claim 6, wherein the first part for connection with the drainage duct has variable dimensions adapted to those of the said drainage duct.

8. Aircraft according to claim 1, wherein said at least one pass-through device comprises a component forming an axial stop.

9. Aircraft according to claim 8, wherein the component forming an axial stop is adapted to compress the insulation blanket.

10. Aircraft according to claim 6, wherein the support fastened to the wall of the fuselage comprises a first portion fastened to the wall and a second portion on which the second part of said at least one pass-through device is assembled through the said at least one assembly component.

11. Aircraft according to claim 10, wherein the second portion of the support is slanted in relation to the first portion and in relation to the vertical.

12. Aircraft according to claim 10, wherein the second portion has a through-hole in which said at least one assembly component is inserted axially, said at least one assembly component being provided with at least one retaining element preventing its axial withdrawal out of the hole.

13. Aircraft according to claim 1, wherein the drainage system is able to drain the condensation water between an upper zone of the aircraft where the said water is formed and a lower zone where it is collected, the insulation blanket being arranged from the upper zone to the lower zone, said at least one drainage duct extending into the upper zone and said at least one pass-through device being arranged in proximity to a separation between the upper zone and an intermediate zone situated between the upper and lower zones, the condensation water being drained from the intermediate zone to the lower zone.

14. Aircraft according to claim 13, wherein the upper zone is a passenger zone and the intermediate zone is a non-passenger zone separated from the upper zone by a floor.

15. Method for drainage of condensation water formed inside the fuselage of an aircraft having a thermal insulation blanket having two opposite faces with a first face being arranged facing an inner surface of a wall of the fuselage and a second face opposite the first face and arranged facing an interior space of the fuselage, the method comprising:
- draining the condensation water partially along the second opposite face of the thermal insulation blanket facing the interior space;
- draining the condensation water through the insulation blanket; and
- draining the said condensation water having passed through the insulation blanket between the first face of the insulation blanket and the inner surface of the wall of the fuselage.

* * * * *